United States Patent
Fried et al.

(10) Patent No.: US 11,144,321 B2
(45) Date of Patent: Oct. 12, 2021

(54) STORE HIT MULTIPLE LOAD SIDE REGISTER FOR PREVENTING A SUBSEQUENT STORE MEMORY VIOLATION

(71) Applicant: International Business Machines Corporation, Armonk, NY (US)

(72) Inventors: Yair Fried, Petah Tiqwa (IL); Jonathan Hsieh, Poughkeepsie, NY (US); Eyal Naor, Tel-Aviv (IL); James Bonanno, Wappingers Falls, NY (US); Gregory William Alexander, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 181 days.

(21) Appl. No.: 16/280,285

(22) Filed: Feb. 20, 2019

(65) Prior Publication Data
US 2020/0264885 A1 Aug. 20, 2020

(51) Int. Cl.
*G06F 9/30* (2018.01)
*G06F 9/38* (2018.01)

(52) U.S. Cl.
CPC ........ *G06F 9/3808* (2013.01); *G06F 9/30021* (2013.01); *G06F 9/30043* (2013.01)

(58) Field of Classification Search
CPC .............................. G06F 9/3834; G06F 9/3861
See application file for complete search history.

(56) References Cited

U.S. PATENT DOCUMENTS

| | | | |
|---|---|---|---|
| 9,495,156 B1* | 11/2016 | Alexander | G06F 9/30021 |
| 9,524,165 B1 | 12/2016 | Hutton et al. | |
| 10,437,595 B1* | 10/2019 | Kanapathipillai | G06F 9/30145 |
| 2010/0306509 A1* | 12/2010 | Day | G06F 9/3838 712/217 |
| 2011/0154116 A1 | 6/2011 | Alexander et al. | |
| 2013/0339670 A1* | 12/2013 | Busaba | G06F 9/3017 712/216 |
| 2015/0309792 A1* | 10/2015 | Meier | G06F 9/30043 712/225 |
| 2016/0117255 A1* | 4/2016 | Marshall | G06F 12/0804 711/3 |
| 2017/0060593 A1* | 3/2017 | Krishna | G06F 9/384 |
| 2018/0074826 A1 | 3/2018 | Gschwind et al. | |
| 2018/0095766 A1* | 4/2018 | Friedmann | G06F 9/3808 |

\* cited by examiner

*Primary Examiner* — Jacob Petranek
(74) *Attorney, Agent, or Firm* — Cantor Colburn LLP; Margaret McNamara (57) ABSTRACT

Examples of techniques for store hit multiple load side register for operand store compare are described herein. An aspect includes, based on detecting a store hit multiple load condition in the processor, updating a register of the processor to hold information corresponding to a first store instruction that triggered the detected store hit multiple load condition. Another aspect includes, based on issuing a second store instruction in the processor, determining whether the second store instruction corresponds to the information in the register. Another aspect includes, based on determining that the second store instruction corresponds to the information in the register, tagging the second store instruction with an operand store compare mark.

14 Claims, 5 Drawing Sheets

STORE HIT MULTIPLE LOAD SIDE REGISTER FOR PREVENTING A SUBSEQUENT STORE MEMORY VIOLATION

BACKGROUND

The present techniques relate to processors. More specifically, the techniques relate to a store hit multiple load side register for operand store compare in a processor.

Reducing cycles per instruction (CPI) improves processor performance. CPI may be increased by operand store compare (OSC) penalties which occur when an instruction with an operand to store data to memory is followed by an instruction to load the data from the same memory location before the data actually reaches the memory. The memory may be indicated by the implied registers, memory locations, immediate fields, or combinations of registers and immediate fields indicated in the opcode of instructions. One problem with the handling of OSC is that it may not be recognized until after a memory access address is formed, which may occur after the instruction has been issued. Costly processor pipeline stall, recycle and reset mechanisms are necessary to remedy an OSC. The stall and reset mechanisms may result in a penalty of many cycles of unused processing time.

In a system with processors capable of out-of-order (OOO) processing, in which instructions may be processed out-of-order relative to the order in which they are fetched and decoded, the OSC penalties may increase, since an incorrect loaded value obtained by a load instruction subject to the OSC may have been used in downstream instructions.

A microprocessor that is capable of issuing and executing machine instructions out of order will in general permit loads to be executed ahead of stores. This feature permits a large performance advantage provided that the load address and the store address do not both have the same physical address. In typical programs, the frequency that a load proceeds ahead of the store and that their physical address matches is low. However, since the discovery of this store violation condition is typically late in the instruction execution pipeline, the recovery penalty can be quite severe. For example, the recovery process typically involves invalidating the load instruction that caused the violation and all newer instructions in program order beyond the load instruction, and second reissuing the load instruction.

SUMMARY

According to an embodiment described herein, a system can include a processor to, based on detecting a store hit multiple load condition in the processor, update a register of the processor to hold information corresponding to a first store instruction that triggered the detected store hit multiple load condition. The processor can also, based on issuing a second store instruction in the processor, determine whether the second store instruction corresponds to the information in the register. The processor can also, based on determining that the second store instruction corresponds to the information in the register, tag the second store instruction with an operand store compare mark.

According to another embodiment described herein, a method can include based on detecting a store hit multiple load condition in the processor, updating a register of the processor to hold information corresponding to a first store instruction that triggered the detected store hit multiple load condition. The method can also include, based on issuing a second store instruction in the processor, determining whether the second store instruction corresponds to the information in the register. The method can also include, based on determining that the second store instruction corresponds to the information in the register, tagging the second store instruction with an operand store compare mark.

According to another embodiment described herein, an apparatus can include program code to, based on detecting a store hit multiple load condition in the processor, update a register of the processor to hold information corresponding to a first store instruction that triggered the detected store hit multiple load condition. The apparatus can also include program code to, based on issuing a second store instruction in the processor, determine whether the second store instruction corresponds to the information in the register. The apparatus can also include program code to, based on determining that the second store instruction corresponds to the information in the register, tag the second store instruction with an operand store compare mark.

DETAILED DESCRIPTION

Embodiments of store hit multiple load side register (SHMLSR) for operand store compare (OSC) are provided, with exemplary embodiments being discussed below in detail. In out-of-order execution, when an older store instruction is issued after a younger load instruction that is directed to the same memory location, the processor must flush the execution pipeline from the load instruction. The processor may also tag the culprit store instruction with an OSC marking. The OSC marking may ensure that on any subsequent iterations of the store instruction, the OSC error may be avoided (e.g., by forcing the store and the load to execute in order).

In a case in which a store instruction is bypassed by multiple load instructions that are directed to the same memory location in the execution pipeline, it may not be feasible to detect which of the load instructions is the oldest, in order to determine the flush point to correct the OSC error. Therefore, the instruction pipeline may be flushed from the culprit store instruction. However, flushing the store instruction may also flush any OSC marking that is associated with the store instruction in the pipeline. Therefore, on a subsequent execution of the culprit store instruction, the OSC error may repeat due to the absence of the OSC marking. A register (e.g., a SHMLSR) may be used to store information regarding OSC markings in the execution pipeline. Any data in the register may survive a pipeline flush of a store instruction with an associated OSC marking. The register may then be checked when the store is reissued, so that the store instruction may be retagged in the execution pipeline with the OSC marking.

When a store hit multiple load condition is detected, an identifier of the culprit store instruction (e.g., a unique tag that identifies the store instruction) may be stored in the register. The register may also have a valid indicator (e.g., a single bit) that is set when an instruction identifier is stored in the register. When a store instruction is issued, if the store instruction matches the instruction identifier in the register and the valid indicator is set, that store instruction may be tagged with an OSC marking. In embodiments in which the valid indicator in the register is already set, a subsequent store that causes a store hit multiple load condition may not update the register. In some embodiments, the valid indicator in the register may be unset based on the instruction stream being flushed from a point that is older than the store instruction indicated by the data in the register or based on the store instruction that is indicated by the register completing successfully.

Figure 1:
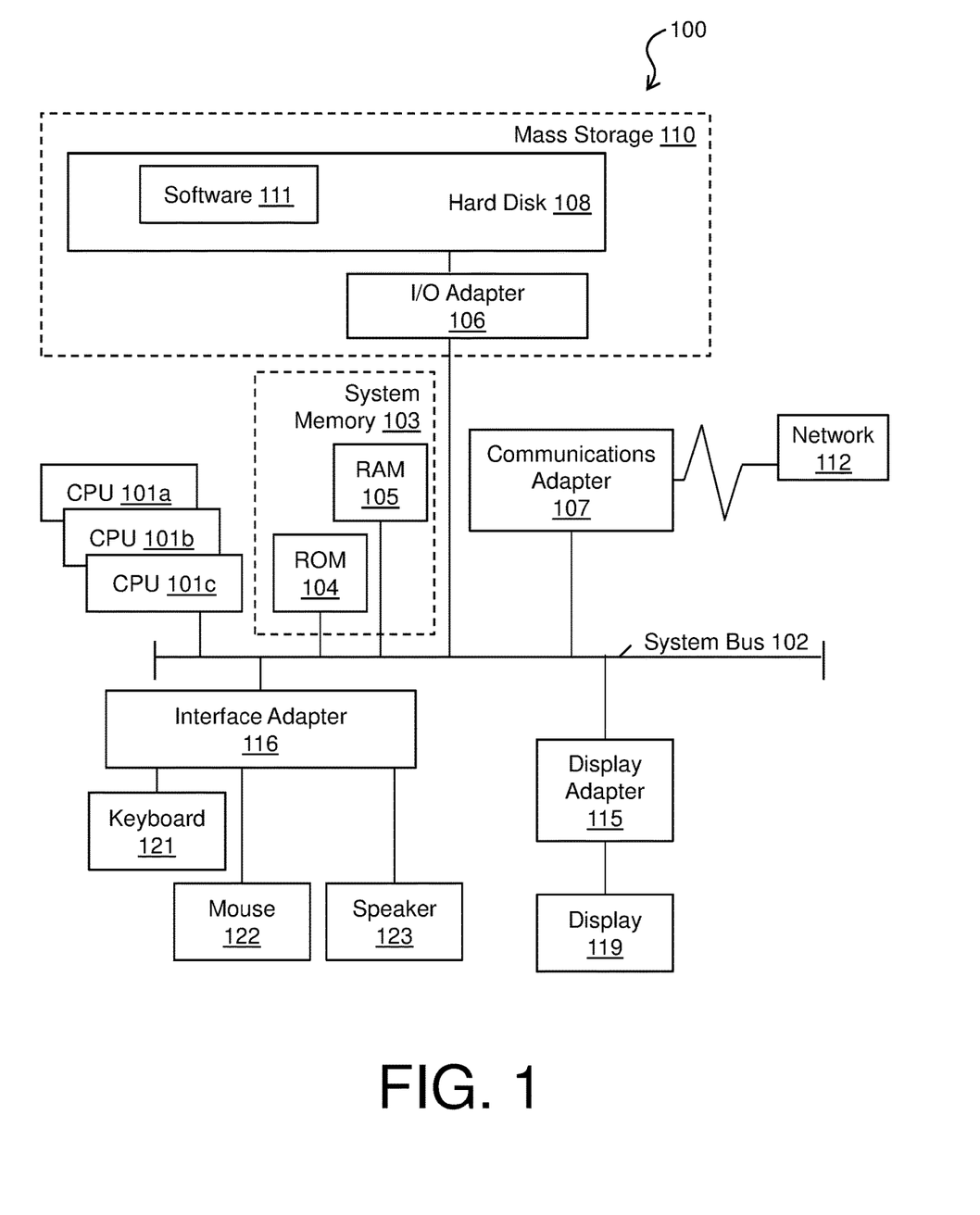
FIG. 1 is a block diagram of an example computer system for a store hit multiple load side register for operand store compare.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101*a*, 101*b*, 101*c*, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
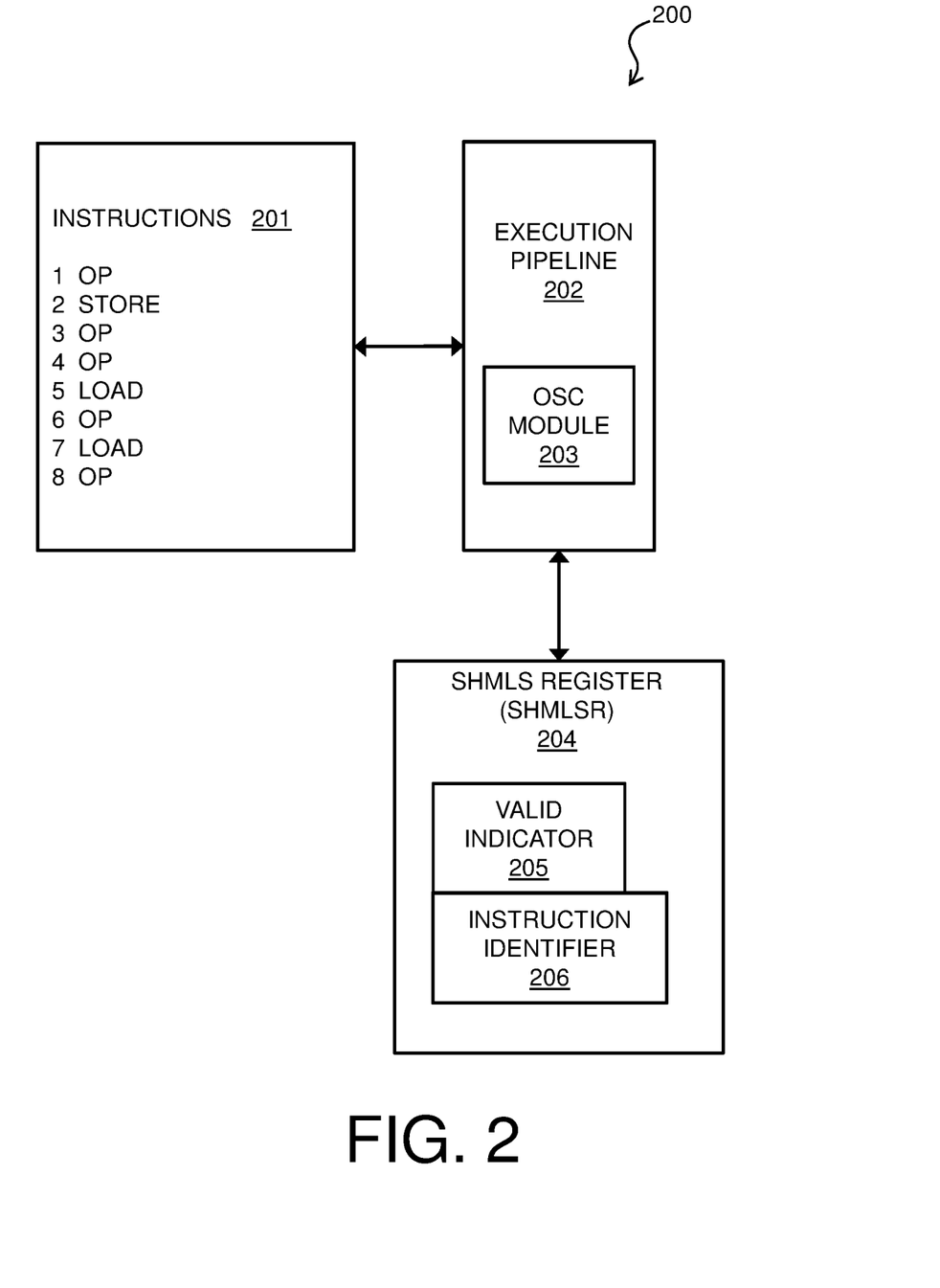
FIG. 2 is a block diagram of an example system including a store hit multiple load side register for operand store compare.

FIG. 2 is a block diagram of an example system 200 including a store hit multiple load side register (SHMLSR) 204 for operand store compare. System 200 may be implemented in a processor such as processor 101 of computer system 100 of FIG. 1. System 200 includes an execution pipeline 202 that processes instructions, such as instructions 201, during execution of software such as software 111 of FIG. 1. Instructions 201 are shown in program order, i.e., the order in which they appear in the software that is being executed. The execution pipeline 202 may include, in some embodiments, a plurality of stages that process the instructions as the instructions proceed through the pipeline, including but not limited to fetch, decode, dispatch, issue, reorder/completion, and commit. Because some types of instructions may require more clock cycles to process than others (e.g., a store may require more clock cycles than a load), the instructions 201 may be executed out of order in the execution pipeline 202. The execution pipeline 202 includes an operand store compare (OSC) module 203 and is in communication with a SHMLSR 204 of the processor 101. The SHMLSR 204 includes a valid indicator 205, which may be a single bit in some embodiments. The SHMLSR 204 further includes a data field comprising an instruction identifier 206. The instruction identifier (ID) 206 may be any data that may be used to identify a particular instruction, including but not limited to an instruction address. The instruction identifier 206 may store an instruction address corresponding to a store instruction that has triggered a store hit multiple load condition. The operation of the SHMLSR 204 is discussed in further detail below with respect to FIGS. 3-5.

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., additional memory components, embedded controllers, modules, additional network interfaces, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
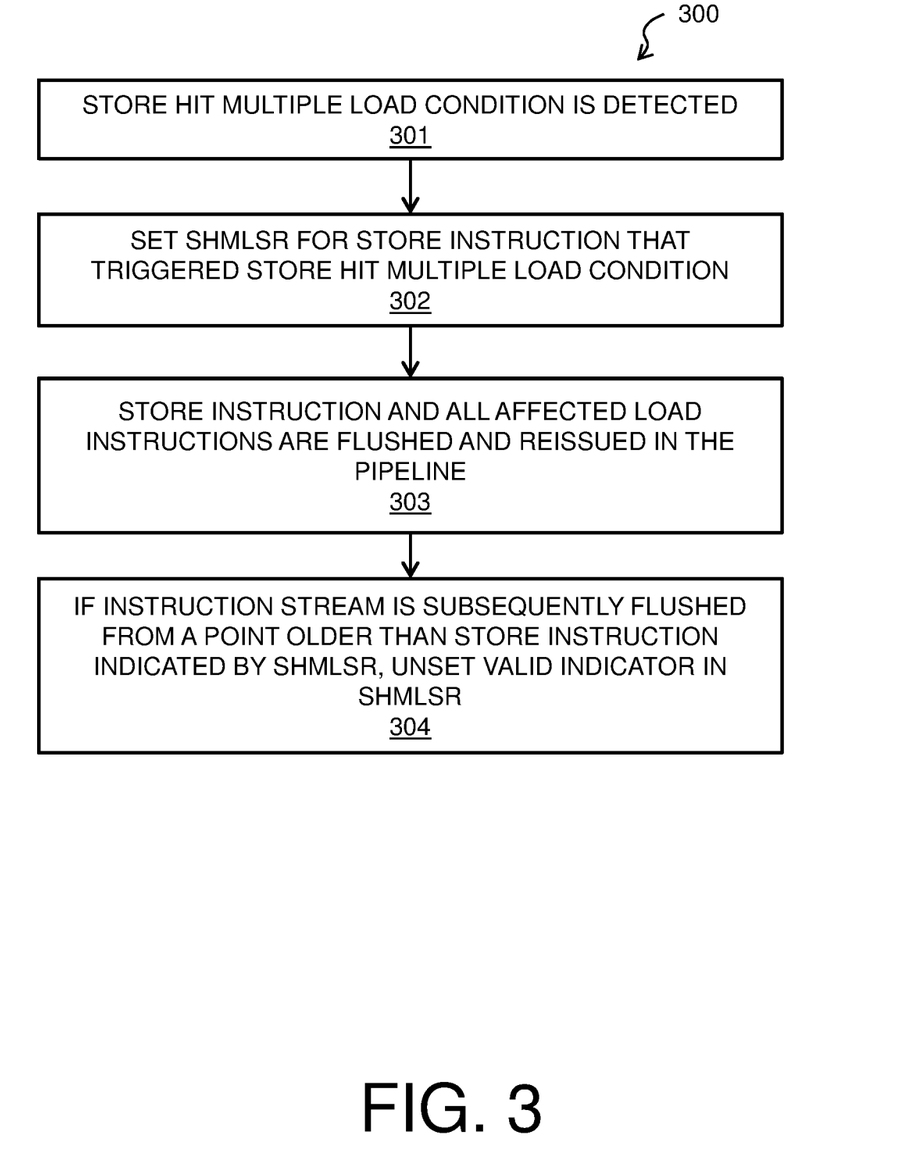
FIG. 3 is a process flow diagram of an example method for a store hit multiple load side register for operand store compare.

FIG. 3 is a process flow diagram of an example method 300 for a store hit multiple load side register for operand store compare. Method 300 may be implemented in system 200 of FIG. 2. In block 301 of method 300, a store hit multiple load condition is detected in the execution pipeline 202 by, for example, OSC module 203. The store hit multiple load condition may be detected when multiple load instructions directed to a memory location are issued in the execution pipeline 202 before a store instruction that is located before multiple load instructions in the program order, and that is directed to the same memory location. (e.g., store 2 is issued after load 5 and load 7 in instructions 201). In block 302, the SHMLSR 204 is set for the store that triggered the store hit multiple load condition. Setting the SHMLSR 204 may include setting the valid indicator 205 to valid (e.g., '1') and setting the instruction identifier 206 to hold an instruction address of the store (e.g., '2' for store 2 of instructions 201). In block 303, the store and all affected load instructions are flushed and reissued in the execution pipeline 202. This allows execution of the instructions 201 to restart from the culprit store. In block 304, if, during subsequent execution, the instruction stream is flushed starting at a point that is older than the store that is indicated by instruction identifier 206 in the SHMLSR 204, the valid indicator 205 in the SHMLSR is unset (e.g., set to '0'). Method 300 of FIG. 3 may be implemented in an execution pipeline 202 whenever a store hit multiple load condition is detected by OSC module 203. An example implementation of method 300 of FIG. 3 is discussed in further detail below with respect to FIG. 5.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
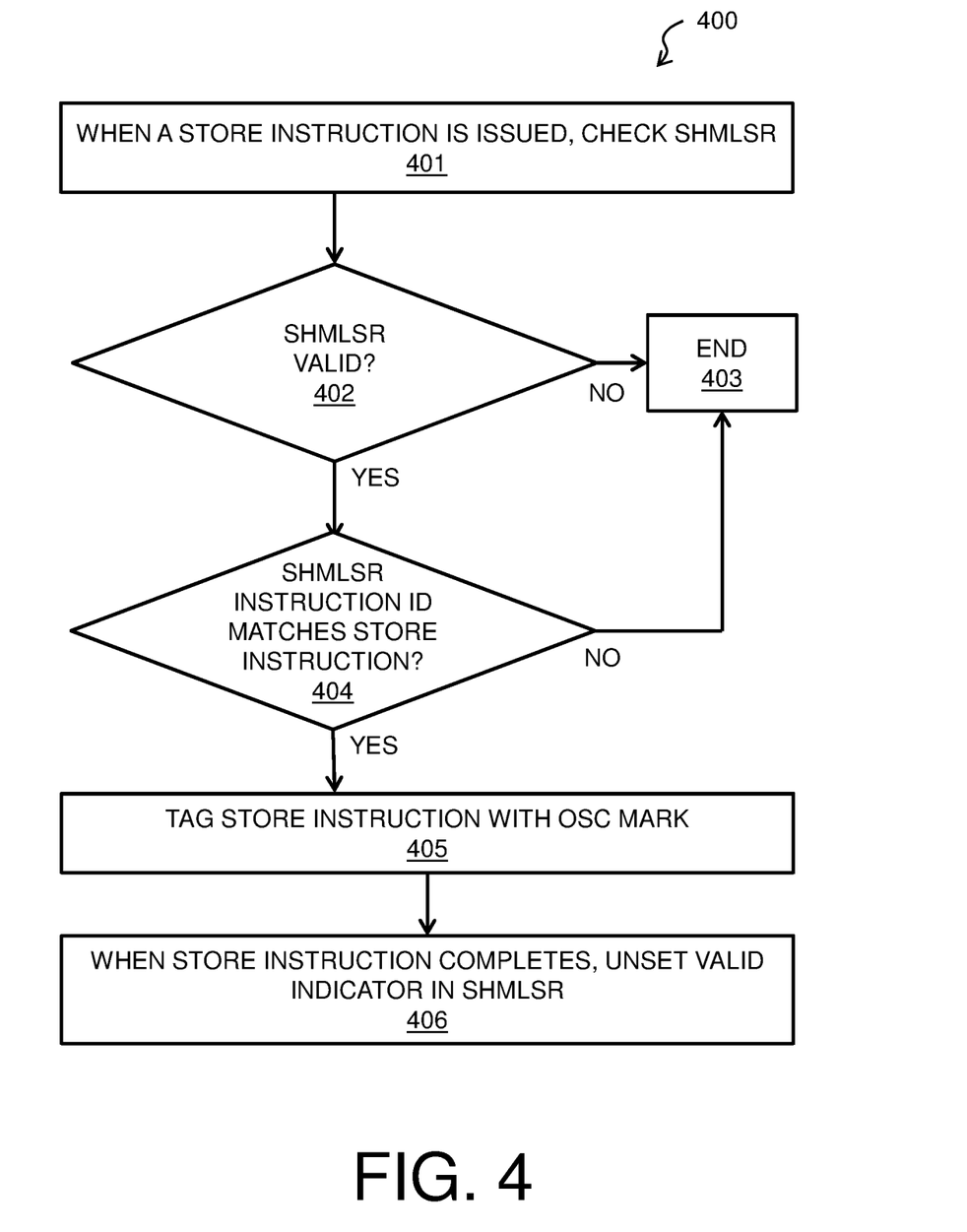
FIG. 4 is a process flow diagram of another example method for a store hit multiple load side register for operand store compare.

FIG. 4 is a process flow diagram of another example method 400 for a store hit multiple load side register for operand store compare. Method 400 may be implemented in system 200 of FIG. 2. In block 401 of method 400, when a store instruction is issued in the execution pipeline 202, the SHMLSR 204 is checked. In block 402, it is determined whether the valid indicator 205 is set. If the valid indicator is determined not to be set (e.g., '0') in block 402, flow proceeds from block 402 to block 403, in which execution of the store that was issued in block 401 proceeds without any OSC tagging, and method 400 ends. If it is determined in block 402 that the valid indicator 205 is set (e.g., '1'), flow proceeds from block 402 to block 404. In block 404 it is determined whether the instruction identifier 206 in the SHMLSR 204 matches the store instruction that was issued in block 401. The determination of block 404 may be made based on whether an instruction address of the store instruction that was issued in block 401 matches the value stored in the instruction identifier 206 in some embodiments. If it is determined in block 404 that the instruction identifier 206 does not match the store instruction that was issued in block 401, flow proceeds from block 404 to block 403, in which execution of the store that was issued in block 401 proceeds without any OSC tagging, and method 400 ends. If it is determined in block 404 that the instruction identifier 206 matches the store instruction that was issued in block 401, flow proceeds from block 404 to block 405. In block 405, the store instruction that was issued in block 401 is tagged with an OSC mark. The OSC mark may trigger the OSC module 203 to cause the store instruction and any subsequent loads to be forced to execute in order, so as to avoid OSC errors. In block 406, based on successful completion of the store instruction that corresponds to instruction identifier 206, the valid indicator 205 in the SHMLSR 204 is unset (e.g., set to '0'). Method 400 of FIG. 4 may be performed in an execution pipeline 202 whenever a store instruction is issued.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
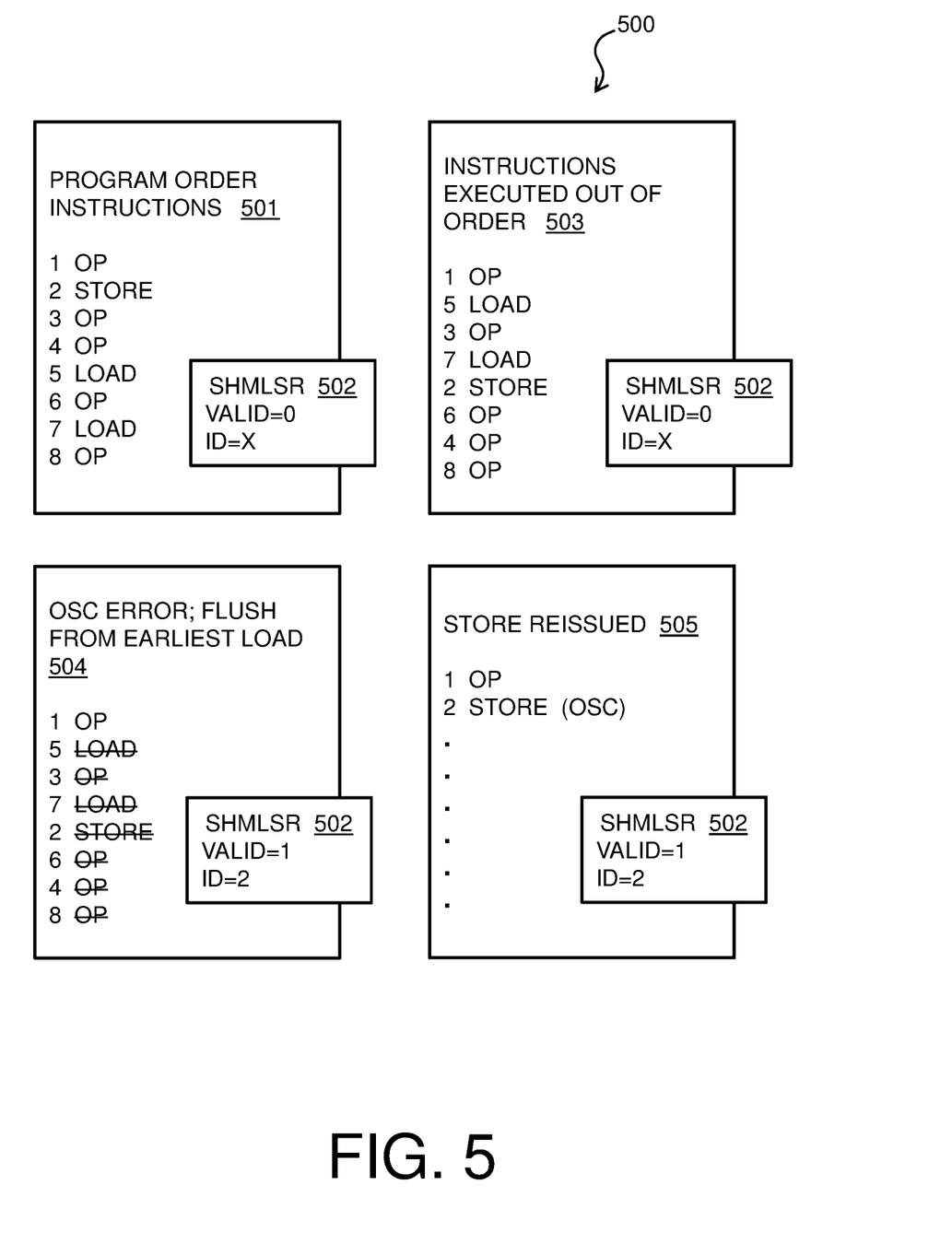
FIG. 5 is a block diagram of an example implementation of a store hit multiple load side register for operand store compare.

FIG. 5 is a block diagram of an example 500 of a store hit multiple load side register for operand store compare. Example 500 shows a plurality of instructions that are executed out of order by an execution pipeline such as pipeline 202 of FIG. 2, and a current state of an SHMLSR 502, which may be SHMLSR 204 of FIG. 2, during the execution of the instructions. Example 500 is discussed with respect to method 300 of FIG. 3 and method 400 of FIG. 4. Program order instructions 501 include operation (OP) 1, store 2, OP 3, OP 4, load 5, OP 6, load 7, and OP 8. In the example 500, store 2, load 5, and load 7 are all directed to the same memory address. Initially, the SHMLSR 502 is invalid (e.g., '0'), and the instruction ID may hold any data (e.g., X). The instructions are executed out of order by an execution pipeline 202. As shown in out of order instructions 503, multiple loads (load 5 and load 7) are issued before store 2 by the out of order execution, which causes OSC module 203 to detect an OSC error comprising a store hit multiple load condition (block 301 of FIG. 3). The store hit multiple load condition causes the SHMLSR 502 to be set to valid (e.g., '1'), and updated to hold an instruction identifier corresponding to the store that triggered the OSC error (e.g., 2, for store 2) (block 302 of FIG. 3). The instructions are flushed in the pipeline starting from the store (e.g., store 2), as shown in instructions 504 (block 303 of FIG. 3). The store 2 is then reissued as shown in instructions 505 (block 401 of FIG. 4). Because the SHMLSR 502 is valid (block 402 of FIG. 4) and store 2 matches the instruction identifier in the SHMLSR 502 (block 404 of FIG. 4), store 2 is tagged with an OSC mark (block 405 of FIG. 4). FIG. 5 is shown for illustrative purposes only; for example, any appropriate number and types of instructions may be processed in various embodiments.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
based on detecting a first store hit multiple load condition in the processor, update a store hit multiple load side register (SHMLSR) of the processor to hold information corresponding to a first store instruction that triggered the detected first store hit multiple load condition, wherein updating the SHMLSR of the processor comprises:
setting a valid indicator in the SHMLSR; and
updating a data field of the SHMLSR to hold an instruction identifier corresponding to the first store instruction;
based on detecting a second store hit multiple load condition in the processor, determine that the valid indicator in the SHMLSR is set;
based on determining that the valid indicator is set, not update the SHMLSR based on the second store hit multiple load condition in the processor;
based on issuing a second store instruction in the processor, determine whether the second store instruction corresponds to the information in the SHMLSR;
based on determining that the second store instruction corresponds to the information in the SHMLSR, tag the second store instruction with an operand store compare mark; and
upon completion of the second store instruction, unset the valid indicator in the SHMLSR.

2. The system of claim 1, wherein determining whether the second store instruction corresponds to the information in the SHMLSR comprises:
determining whether the valid indicator in the SHMLSR is set;
based on determining that the valid indicator in the SHMLSR is set, determining whether an instruction identifier of the second store instruction corresponds to the instruction identifier in the SHMLSR; and
based on determining that the instruction identifier of the second store instruction corresponds to the instruction identifier in the SHMLSR, determining that the second store instruction corresponds to the information in the SHMLSR.

3. The system of claim 2, wherein determining whether the second store instruction corresponds to the information in the SHMLSR comprises:
based on determining that the valid indicator in the SHMLSR is unset, determining that the second store instruction does not correspond to the information in the SHMLSR.

4. The system of claim 1, wherein the processor is configured to:
based on flushing of an instruction stream that includes the second store instruction from a point that is older than the second store instruction, unset the valid indicator in the SHMLSR.

5. The system of claim 1, wherein the processor is configured to:
based on detecting the first store hit multiple load condition, flush the first store instruction and a plurality of load instructions associated with the first store hit multiple load condition.

6. A computer-implemented method, comprising:
based on detecting a first store hit multiple load condition in a processor, updating a store hit multiple load side register (SHMLSR) of the processor to hold information corresponding to a first store instruction that triggered the detected first store hit multiple load condition, wherein updating the SHMLSR of the processor comprises:
setting a valid indicator in the SHMLSR; and
updating a data field of the SHMLSR to hold an instruction identifier corresponding to the first store instruction;

based on detecting a second store hit multiple load condition in the processor, determining that the valid indicator in the SHMLSR is set;

based on determining that the valid indicator is set, not updating the SHMLSR based on the second store hit multiple load condition in the processor;

based on issuing a second store instruction in the processor, determining whether the second store instruction corresponds to the information in the SHMLSR;

based on determining that the second store instruction corresponds to the information in the SHMLSR, tagging the second store instruction with an operand store compare mark; and upon completion of the second store instruction, unsetting the valid indicator in the SHMLSR.

7. The computer-implemented method of claim 6, wherein determining whether the second store instruction corresponds to the information in the SHMLSR comprises:

determining whether the valid indicator in the SHMLSR is set;

based on determining that the valid indicator in the SHMLSR is set, determining whether an instruction identifier of the second store instruction corresponds to the instruction identifier in the SHMLSR; and based on determining that the instruction identifier of the second store instruction corresponds to the instruction identifier in the SHMLSR, determining that the second store instruction corresponds to the information in the SHMLSR.

8. The computer-implemented method of claim 7, wherein determining whether the second store instruction corresponds to the information in the SHMLSR comprises:

based on determining that the valid indicator in the SHMLSR is unset, determining that the second store instruction does not correspond to the information in the SHMLSR.

9. The computer-implemented method of claim 6, comprising:

based on flushing of an instruction stream that includes the second store instruction from a point that is older than the second store instruction, unsetting the valid indicator in the SHMLSR.

10. The computer-implemented method of claim 6, comprising:

based on detecting the first store hit multiple load condition, flush the first store instruction and a plurality of load instructions associated with the first store hit multiple load condition.

11. An apparatus, comprising program code executable by a processor to:

based on detecting a first store hit multiple load condition in the processor, update a store hit multiple load side register (SHMLSR) of the processor to hold information corresponding to a first store instruction that triggered the detected first store hit multiple load condition, wherein updating the SHMLSR of the processor comprises:

setting a valid indicator in the SHMLSR; and updating a data field of the SHMLSR to hold an instruction identifier corresponding to the first store instruction;

based on detecting a second store hit multiple load condition in the processor, determine that the valid indicator in the SHMLSR is set;

based on determining that the valid indicator is set, not update the SHMLSR based on the second store hit multiple load condition in the processor;

based on issuing a second store instruction in the processor, determine whether the second store instruction corresponds to the information in the SHMLSR;

based on determining that the second store instruction corresponds to the information in the SHMLSR, tag the second store instruction with an operand store compare mark; and upon completion of the second store instruction, unset the valid indicator in the SHMLSR.

12. The apparatus of claim 11, wherein determining whether the second store instruction corresponds to the information in the SHMLSR comprises:

determining whether the valid indicator in the SHMLSR is set;

based on determining that the valid indicator in the SHMLSR is set, determining whether an instruction identifier of the second store instruction corresponds to the instruction identifier in the SHMLSR; and based on determining that the instruction identifier of the second store instruction corresponds to the instruction identifier in the SHMLSR, determining that the second store instruction corresponds to the information in the SHMLSR.

13. The apparatus of claim 12, wherein determining whether the second store instruction corresponds to the information in the SHMLSR comprises:

based on determining that the valid indicator in the SHMLSR is unset, determining that the second store instruction does not correspond to the information in the SHMLSR.

14. The apparatus of claim 11, comprising program code executable by the processor to:

based on flushing of an instruction stream that includes the second store instruction from a point that is older than the second store instruction, unset the valid indicator in the SHMLSR.

* * * * *